United States Patent [19]

Ponzielli

[11] 4,435,523

[45] Mar. 6, 1984

[54] PROCESS FOR MANUFACTURING ARTICLES OF FOAMED THERMOPLASTIC MATERIAL AND ARTICLE PRODUCED THEREBY

[75] Inventor: Giuseppe Ponzielli, Milan, Italy

[73] Assignee: Coulson Heel Inc., Hanover, Pa.

[21] Appl. No.: 410,952

[22] Filed: Aug. 24, 1982

[30] Foreign Application Priority Data

Sep. 25, 1981 [IT] Italy .............................. 24159 A/81

[51] Int. Cl.³ ............................................ B29D 27/00
[52] U.S. Cl. ...................................... 521/51; 264/45.5; 264/54; 264/513; 264/528; 264/DIG. 83; 425/552; 425/817 R; 521/95; 521/143; 521/146
[58] Field of Search ............. 264/45.1, DIG. 83, 45.5, 264/54, 513, 528; 521/51, 95, 143, 146; 425/552, 817 R

[56] References Cited

U.S. PATENT DOCUMENTS

| | | | |
|---|---|---|---|
| 4,033,710 | 7/1977 | Hanning | 425/543 |
| 4,106,887 | 8/1978 | Yasuike et al. | 425/549 |
| 4,115,491 | 9/1978 | Hanning | 264/45.1 |
| 4,129,635 | 12/1978 | Yasuike et al. | 264/DIG. 83 |
| 4,140,672 | 2/1979 | Kataoka | 264/45.1 |
| 4,247,515 | 1/1981 | Olabisi | 264/45.1 X |

Primary Examiner—Philip E. Anderson
Attorney, Agent, or Firm—Antonelli, Terry & Wands

[57] ABSTRACT

A process for producing injection molded articles of foamed thermoplastic material via injecting of a molten mass of thermoplastic material containing a foaming agent into a mold cavity is improved so as to substantially reduce production time by the utilization of a step introducing a cold compressed gas into the mold cavity internally of the injected mass of material, while it is still at least internally molten. The article produced by the process is characterized by an outer skin of tightly structured material surrounding a body of microcellular foam material having an internal void or voids bounded by material of a tightly structured nature.

11 Claims, 2 Drawing Figures

PROCESS FOR MANUFACTURING ARTICLES OF FOAMED THERMOPLASTIC MATERIAL AND ARTICLE PRODUCED THEREBY

BACKGROUND AND SUMMARY OF THE INVENTION

The present application relates to an improved process for manufacturing articles of foamed thermoplastic material and an article produced thereby, and more particularly, wherein foaming of the thermoplastic material is produced by means of a foaming agent mixed therein.

It is well known to manufacture articles having a cellular structure of uniform weight and minimum density from a thermoplastic material by injection molding. Such articles, particularly as used in the footwear industry, are generally formed of polyethylene, polypropylene, polystyrene, or thermoplastic rubber, through the use of rotary type injection molding machines which have a plurality of injection stations.

However, the cellular structure of the foamed thermoplastic material exhibits the characteristic of inhibiting heat dispersion from the interior of the manufactured article to the mold. As a result, molding times are disadvantageously extended, thereby slowing down the rate of production of the intended machines, i.e., the molding machines cannot operate at their optimum production rate.

Another disadvantage associated with conventional injection molding processes is the formation of blowholes or bubbles on the outer surface of the manufactured article, particularly when low density polyethylene is utilized, as a result of excess gas being entrapped between the manufactured article and the mold. Attempts which have been made to correct this problem by the addition to the injected material of such agents as inoculants having particular characteristics of fluidity and density, or through utilizing suitable filter inserts for exhausting the excess gas exteriorly of the mold, have given very poor results which have not been satisfactory.

A further, but not last, disadvantage of conventional injection processes is that a drop of foamed material is formed on the inlet conduit (sprue bushing) of the mold, which drop often has to be manually removed prior to the next injection cycle.

In view of the foregoing, it is a principal object of the present invention to provide an improved process for creating articles manufactured from foamed thermoplastic materials which will avoid the above-noted disadvantages of the prior art processes, particularly by substantially reducing molding cycle times.

In accordance with a preferred embodiment of the present invention, the above-noted object is achieved through an injection molding process wherein cold compressed gas, e.g. air, is injected into the cavity of the mold internally of the mass of injected thermoplastic material contained in said cavity, while the material is still in its molten or plastic state.

In this regard, it is noted that the introduction of air into a mass of material contained within a mold is not novel per se. For example, in U.S. Pat. Nos. 4,106,887 and 4,129,635 to Yasuike, et al. a method and apparatus are disclosed wherein a gas under pressure is injected into a still molten material within a mold cavity so as to create a hollow within the foamed material. However, formation of a void within the article produced in accordance with the present method is a by product, not a sought after object. Reflecting this difference in purpose, Yasuike, et al. teach heating of their gas prior to its being charged into the mold cavity so as to prevent the resin material molded by them from cooling, in contrast to the present method which deliberately injects cold gas into the molten material so as to cool the same.

Similarly, the use of internal air cooling in connection with the production of articles of expanded material is likewise known per se. For example, in Hanning U.S. Pat. Nos. 4,115,491 and 4,033,710, a method and apparatus is disclosed wherein hollow articles of foamed material are produced in a mold into which a tube is extended for the admission of a coolant into the cavity designed to expedite the hardening of the thermoplastic material therein. However, again, the Hanning patents have for a basic object the obtaining of a desired surface condition utilizing a heated foaming agent. As a result of Hanning's very different purpose and method, he first injects a pressurized fluid into the mold cavity with the internal air cooling being carried out at the end of his process, as opposed to the present invention which injects cold air near the beginning of the molding cycle.

These and other objects, features and advantages of the present invention will become more apparent from the following description when taken in connection with the accompanying drawings, which show, for purposes of illustration only, several embodiments in accordance with the present invention.

DETAILED DESCRIPTION OF THE PREFERRED EMBODIMENTS

Figure 1:
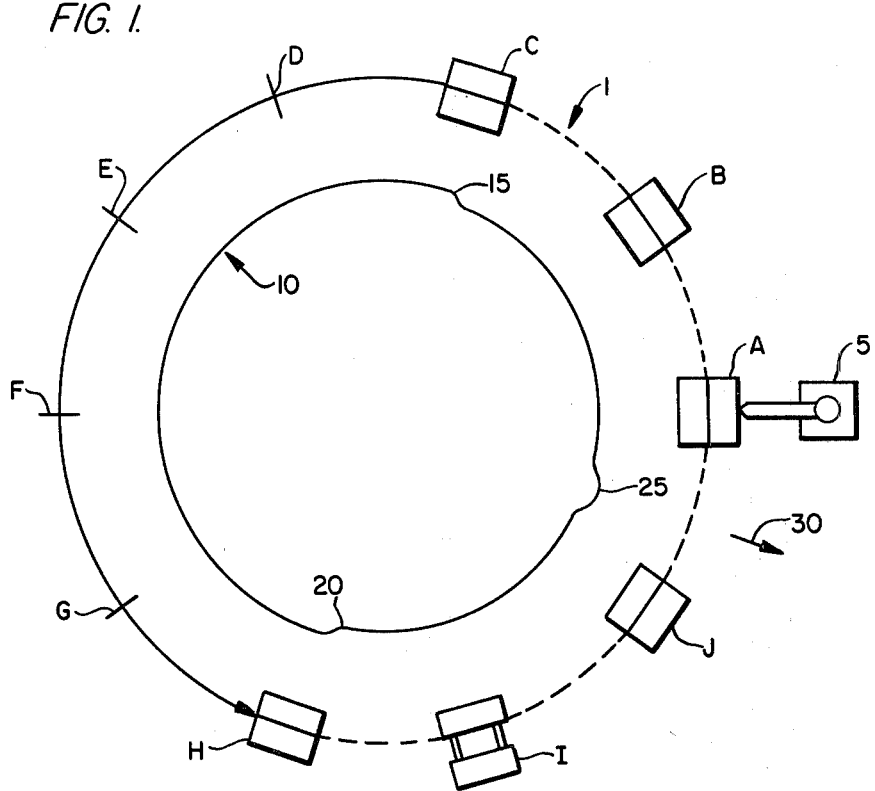
FIG. 1 is a schematic diagram illustrating an embodiment for carrying out the method of the present invention.
Figure 2:
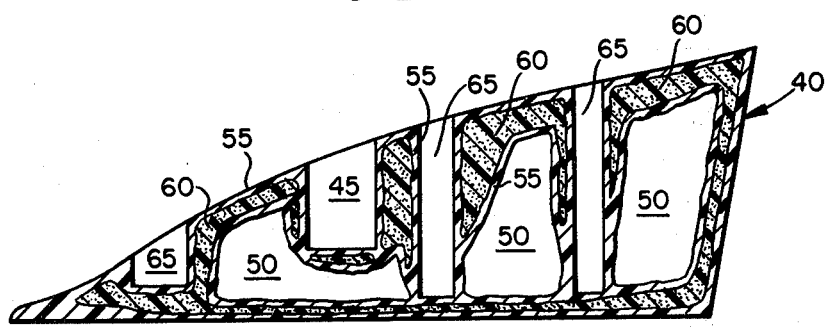
FIG. 2 is a longitudinal cross-sectional view of an article produced in accordance with the process of the present invention

With reference to FIGS. 1 and 2 of the drawings, the improved process of the present invention and the article produced thereby will now be described. In this connection, it is noted that practice of the present invention can be carried out entirely through the use of conventional machinery and equipment that is well known in the injection molding art, with only minor adaptations which will be readily apparent to those of ordinary skill in the art based upon the following disclosure. Furthermore, while the method of the present invention will be described in preferred forms with reference to the use of multiple-mold rotary turret injection presses, it is pointed out that the improved method may be equally performed without difficulty in conventional reciprocating Platen injection molding presses.

In FIG. 1, reference numeral 1 depicts generally a cycle of a rotary turret type of injection molding press having ten molds which are indexable through ten stations A through J. An example of such a rotary press is the model G 800 of the PRESMA Manufacturing Company of Italy which is distributed in the United States by PLASTIMAC. In such a press, the molds are water cooled and the dwell time, i.e., the time that the molds remain at a given station between indexing movements is adjustable. Furthermore, while the plasticizing and transfer-type injector 5 is depicted as having a single barrel, the "PRESMA G 800" has a double-barrel injector, each barrel of which communicates with a respective number of mold cavities through an injector receiving bushing, sprue and runner. After injecting a molten mass of thermoplastic material containing a foaming agent into the cavity or cavities of an injection mold at station A, the filled mold is indexed to station B and a preceding, empty mold is simultaneously brought into position in station A for injection thereof. As this process is repeated, a filled mold precedes from station B to station C and on around with the subsequent indexing movements of the turret to station I, while being cooled by coolant circulated through the walls of the mold. At station I, the mold is opened and the article or articles with any associated runner flash is ejected by conventional knockout pins. Thereafter the mold is reclosed at station J in preparation for returning to injection station A. In conventional utilization of this known rotary turret type molding machine for forming of articles of thermoplastic material containing a foaming agent, the molds are caused to remain in each station for a dwell period of around 31 or 32 seconds between indexing movements so that a total time for a ten station turret to complete one orbit would be 310 to 320 seconds. Such a period of time from initial filling of the mold until it is again available for production of a further article is well below the capacity of such machines, but has been necessary due to the amount of time required for the molten mass of material within the mold to cool sufficiently into an article to be ejected from the mold at station I, because of the poor heat dispersion qualities of said foamed materials noted previously.

In contrast to the above-noted circumstances, in practice of the process of the present invention, the dwell time between indexes has been successfully reduced to around 18 seconds so that a total of only 180 seconds is required, or in other words, an over 70–75% increase in productivity is produced. To achieve this tremendously increased productivity when injection molding articles of foamed thermoplastic materials, the thermoplastic material containing a foaming agent is, as usual, injected into the cavity or cavities of the mold in station A. When the mold has been indexed to station C, a brief period of time (36 seconds) later, a cold compressed gas, such as air, is introduced into the mold cavity internally of the injected mass of material, while it is still at least internally molten, by a nozzle projecting into a central area of the cavity. The supply of cold compressed air is maintained as the mold is continued to be indexed through stations D, E, F, G and H, whereat the cooling air supply is terminated. Thereafter, the mold is indexed to station I where it is opened and the articles conventionally ejected. In this regard, in FIG. 1, the broken line path of the molds represents that portion of the mold indexing path wherein there is no internal cooling of the material within the mold cavity and the solid line indicates where such cooling is conducted. Likewise, curve 10 depicts the air introduction cycle, air being introduced commencing at point 15 and terminated at point 20.

Additionally, in accordance with an optional, further step, a short blast of cooling air 30 may be produced at interval 25 for the purpose of pneumatically expelling any foam material that may remain in the injector bushing of the mold as a result of spillage from the nozzle during retraction thereof.

In order to adapt a conventional injection molding machine for carrying out the process of the present invention, it is only necessary to modify the molds with provision of an appropriate air passage and air introducing nozzle, and to provide a controllable air introduction valve for each mold for regulating the delivery of cold compressed gas to each mold. For example, each mold on the rotatable turret could be provided with a cam-follower actuation rod which travels along a cam having the configuration of curve 10 and mounted to a fixed, central portion of the turret mechanism. Alternatively, the valves could be timer controlled or triggered by limit switch actuators positioned at stations C and H, for example. Various other implementing means will also be apparent to those of ordinary skill in the art and thus the process of the present invention is not intended to be limited to any particular means of implementation.

In order to enable a clear understanding of the process of the present invention, the following example is given:

In a "PRESMA G 800" type of rotary press provided with nine stations, which is intermittently rotated after dwells of 18 seconds, aluminum molds were mounted, each of which was provided with four inner cavities for obtaining inserts having the shape of a flat base heel for women's shoes. The volume of each cavity was 16 cm$^3$ for a total volume of the four cavities of each mold of 640 cm$^3$. Each cavity was provided with a nozzle projecting within the cavity for 14 mm. The arrangement of the nozzle was such as to present a delivery aperture of 3/10 mm substantially at the relevant cavity. At the injection station, each of the four cavities of the mold was injected with a molten mass of thermoplastic material, namely, 75 g of polyethylene and 4 g of azobisformamide, for a total of 300 g polyethylene and 16 g azobisformamide. After being indexed twice, cooled compressed air was introduced into the cavity of the mold internally of the mass of material in each cavity and was maintained as the mold was indexed through four further stations at which time the air supply was terminated. In the eighth station, the molds were opened and the articles removed. In the ninth station the molds were reclosed, and in transit back to the first, injecting, station, a short blast of air was utilized to remove any foamed material which had remained in the injection conduit or mold injector bushing.

With reference, now to FIG. 2, the nature of an article produced in accordance with the process of the present invention will be described. Article 40 is a wedge heel of a women's shoe which typically might be a 115 mm in length with a maximum heighth of approximately 45 mm and a varying width that averages 40 mm. An open-ended recess 45 is formed by the air nozzle which, like in the above example, may project within the cavity for approximately 14 mm and which has a diameter of about 10 mm. As an incidental result of the introduction of cold compressed gas internally of the molten mass of material within the mold cavity, a sort of rough cavity or cavities 50 is caused to be formed within the article due to the tendency of the compressed air to press the material against the outer walls of the mold itself. Such voids are not sought and their shape, location, and existence are purely incidental in nature. Conventionally, when foamed material is injected into a mold cavity, the walls of which are cooled, a thin (1 to 2 mm) skin of tightly structured thermoplastic material is formed at the walls of the mold cavity, which skin surrounds the microcellular thermoplastic foam structure 60 which forms the body of the article. A similar, but usually thinner, skin 55 of tightly structured material is also formed as the wall of the voids produced by the cooled compressed gas.

In producing an article such as shown in FIG. 2 without the introduction of cold compressed air into the molten material, prior art practice was to utilize molds equipped with cores which served principally to reduce the amount of material required to form the article, and structurally stabilize the product by producing correspondingly shaped recesses in the article which are bounded by the above-noted structured skin surface. In carrying out the process of the present invention, such conventional cores can serve a different and important function in the production of load-bearing articles, such as the illustrated heel 40. That is, since the presence of a large void or voids within the interior of the heel can adversely affect the heel's load-bearing ability, by providing the mold with one or more cores projecting into the mold cavity, strengthening columns of tightly structured material 55 will be formed about the cores within the void area prior to introduction of the cold air. In FIG. 2, open-ended recesses 65, have been produced by such cores.

In the above discussion, the examples have made reference to the use of air as the compressed gas introduced into the molten material within the cavity. This compressed air is preferably cooled to as low a temperature as possible without producing icing within the lines and is delivered at a pressure of approximately 85 psi. However, it should be appreciated that other cold compressed gases may be utilized as well.

While we have shown and described only several embodiments in accordance with the present invention, it is understood that the same is not limited thereto but is susceptible of numerous changes and modifications as would be known to those skilled in the art, given the present disclosure, I therefore do not wish to be limited to the details shown and described herein but intend to cover all such changes and modifications as are encompassed by the scope of the appended claims.

I claim:

1. A process for producing injection molded articles of foamed thermoplastic material comprising the steps of:
   (A) injecting a molten mass of thermoplastic material containing a foaming agent into at least one mold cavity of an injection mold;
   (B) after the elapse of a relatively brief period of time from step (A), introducing a refrigerated compressed gas into the mold cavity internally of the injected mass of material, while it is still at least internally molten;
   (C) cooling said mass of material into an article utilizing said internally introduced gas;
   (D) terminating step (B) and shortly thereafter opening the mold for removal of said article.

2. A process according to claim 1, wherein said compressed gas is compressed air.

3. A process according to claim 1 or 2, wherein step (C) is performed utilizing coolant circulated through walls of the mold as well as to the gas introduced during step (B), a skin of tightly structured material being formed thereagainst.

4. A process according to claim 3, wherein said thermoplastic material is selected from the group consisting of polyethylene, polypropylene, polystyrene, and thermoplastic rubber.

5. A process according to claim 3, wherein said mold is provided with at least one core projecting into the mold, wherein a strengthening column of tightly structured material is formed about said core within a void area created within the mass by step (B).

6. A process according to claim 5, wherein said thermoplastic material is selected from the group consisting of polyethylene, polypropylene, polystyrene, and thermoplastic rubber.

7. A process according to claim 1 or 2, wherein step (B) is commenced approximately 36 seconds after step (A).

8. A process according to claim 1 or 2, wherein, after removal of the article and any runner flash associated therewith from the mold, the mold is closed and thereafter said compressed gas is reintroduced into the mold cavity so as to expel from an injector receiving bushing of the mold, any of the thermoplastic material remaining therein.

9. A process according to claim 1 or 2, wherein said thermplastic material is selected from the group consisting of polyethylene, polypropylene, polystyrene, and thermoplastic rubber.

10. A process according to claim 9, wherein said foaming agent is azobisformamide.

11. A foamed thermoplastic article produced by the process of claim 1 or 2.

* * * * *